United States Patent
Tamaru

(10) Patent No.: US 8,184,171 B2
(45) Date of Patent: May 22, 2012

(54) IMAGE PICKUP APPARATUS, IMAGE PROCESSING APPARATUS, IMAGE PICKUP METHOD, AND IMAGE PROCESSING METHOD

(75) Inventor: Masaya Tamaru, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 491 days.

(21) Appl. No.: 12/105,813

(22) Filed: Apr. 18, 2008

(65) Prior Publication Data

US 2008/0259172 A1    Oct. 23, 2008

(30) Foreign Application Priority Data

Apr. 20, 2007    (JP) ................. 2007-112147

(51) Int. Cl.
*H04N 5/225* (2006.01)
(52) U.S. Cl. .................. 348/218.1; 348/345
(58) Field of Classification Search .......... None
See application file for complete search history.

(56) References Cited

U.S. PATENT DOCUMENTS

| | | | |
|---|---|---|---|
| 2002/0181762 A1* | 12/2002 | Silber | 382/154 |
| 2002/0191100 A1* | 12/2002 | Matsunaga et al. | 348/345 |
| 2003/0071909 A1* | 4/2003 | Peters | 348/349 |
| 2004/0080661 A1* | 4/2004 | Afsenius et al. | 348/345 |
| 2006/0098970 A1 | 5/2006 | Sato | |
| 2006/0198623 A1* | 9/2006 | Ono | 396/89 |

FOREIGN PATENT DOCUMENTS

| JP | 11-266388 A | 9/1999 |
|---|---|---|
| JP | 2002-077591 A | 3/2002 |
| JP | 2002-084444 A | 3/2002 |
| JP | 2003-283902 A | 10/2003 |
| JP | 2005-136480 A | 5/2005 |
| JP | 2006-140594 A | 6/2006 |
| JP | 2008-098836 A | 4/2008 |

OTHER PUBLICATIONS

Report on Prior-Art Search for corresponding JP Application No. 2007-112147, 6 pages in English and Japanese.
JP Notice of Reasons for Rejection, dated May 19, 2010, issued in corresponding JP Application No. 2007-112147, 8 pages in English and Japanese.

* cited by examiner

*Primary Examiner* — Lin Ye
*Assistant Examiner* — Dennis Hogue
(74) *Attorney, Agent, or Firm* — Sughrue Mion, PLLC

(57) ABSTRACT

Images are photographed by focus bracket photography at an in-focus position of a main subject and at focal positions followed and preceded by the in-focus position. The images are synthesized so as to obtain a blur-emphasized image in which areas desired to be blurred are appropriately blurred.

7 Claims, 16 Drawing Sheets

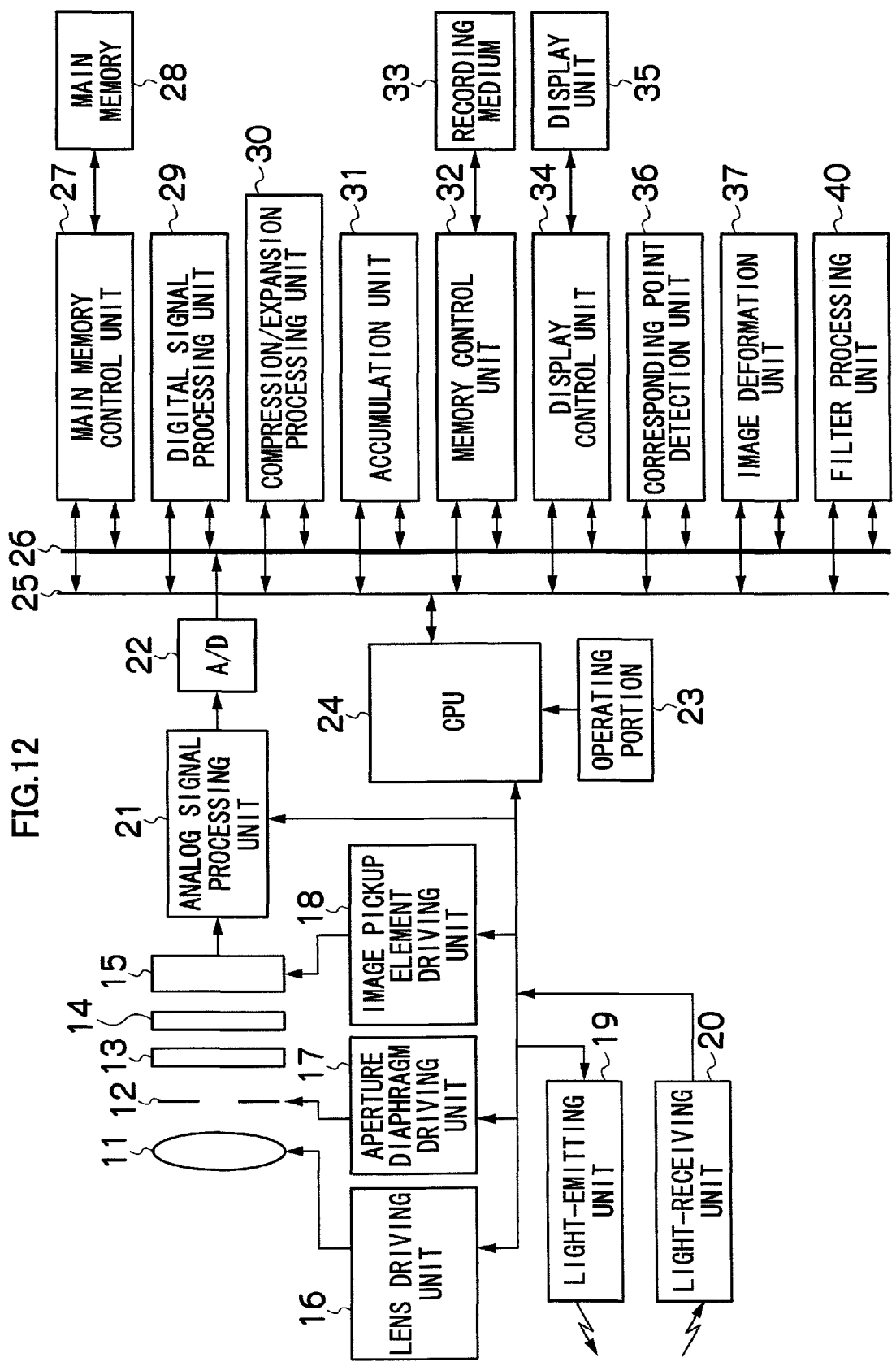

IMAGE PICKUP APPARATUS, IMAGE PROCESSING APPARATUS, IMAGE PICKUP METHOD, AND IMAGE PROCESSING METHOD

BACKGROUND OF THE INVENTION

1. Field of the Invention

The present invention relates to an image pickup apparatus, an image processing apparatus, an image pickup method, and an image processing method and, more particularly, to an image pickup apparatus, an image processing apparatus, an image pickup method, and an image processing method for obtaining a blur-emphasized image by synthesizing a plurality of images the focal positions of which differ from each other.

2. Description of the Related Art

There has heretofore been practiced a photographing method in photography wherein the focus is placed only on a main subject and portions other than the main subject are intentionally defocused by setting the aperture to a full-aperture side and thereby decreasing the depth of field. However, such a photographing method as described above is only possible with a large-sized camera, such as a single-lens reflex camera the aperture of which is manually adjustable. In addition, since the image pickup element of a compact camera or the like is small, it has been difficult to defocus portions other than a main subject even if the aperture is automatically controlled to a full-aperture side.

Hence, there is known a technique to obtain a blur-emphasized image by performing image processing on photographed image data, in order to solve the above-described problems. Japanese Patent Application Laid-Open No. 2006-140594 discloses a digital camera in which an out-of-focus area is detected from the photographed image data to perform blurring process on the out-of-focus area by means of digital signal processing. According to the digital camera described in Japanese Patent Application Laid-Open No. 2006-140594, it is possible to obtain an image, like an image photographed with a decreased depth of field, in which portions other than a main subject are intentionally blurred by means of blurring process, even when an increased depth-of-field image is photographed.

SUMMARY OF THE INVENTION

However, since an out-of-focus area is determined on the basis of light intensity or the like in the digital camera described in Japanese Patent Application Laid-Open No. 2006-140594, without taking into account the frequency characteristic of a subject, no discrimination can be made as to whether the frequency of the subject is inherently low or is lowered due to defocusing. Consequently, it has not been possible to determine a favorable out-of-focus area. Thus, the digital camera has had the drawback that it may not be possible to appropriately blur an area desired to be blurred.

The present invention has been accomplished in view of the above-described problems. It is therefore an object of the present invention to provide an image pickup apparatus, an image processing apparatus, an image pickup method, and image processing method whereby it is possible to obtain an intended blur-emphasized image in which areas desired to be blurred are appropriately blurred, even in a compact camera or the like with which it is difficult to photograph an image with a shallow depth-of-field.

To obtain the object, according to a first aspect of the present invention, an image pickup apparatus comprises: an automatic in-focus position determination device which determines an in-focus position of a main subject on the basis of image data; a focus bracket photography device which obtains a plurality of images by successively photographing images while discretely moving a focal position by a predetermined moving amount; a focal position control device which controls the focal position, so as to include the in-focus position of the main subject determined by the automatic in-focus position determination device and focal positions followed and preceded by the in-focus position; an image synthesis device which synthesizes the plurality of images photographed by the focus bracket photography device, including an image photographed at the in-focus position of the main subject and images photographed at the focal positions followed and preceded by the in-focus position of the main subject; and a recording device which records an image obtained by the image synthesis device on a recording medium.

Consequently, it is possible to obtain a blur-emphasized image.

Preferably, the image synthesis device selects a pixel photographed at the in-focus position of the main subject, among pixels at corresponding coordinates among the plurality of images, if sharpness of the pixel is maximum, selects a pixel photographed at a focal position symmetrical, with respect to the in-focus position of the main subject, to the focal position at which sharpness of a pixel is maximum if the sharpness of the pixel photographed at the focal position other than the in-focus position of the main subject is maximum, and performs image synthesis.

Consequently, it is possible to blur areas desired to be blurred with an appropriate blur amount and to obtain an intended blur-emphasized image.

To obtain the object, according to a second aspect of the invention, an image pickup apparatus comprises: an automatic in-focus position determination device which determines an in-focus position of a main subject on the basis of image data; a focus bracket photography device which obtains a plurality of images by successively photographing images while discretely moving a focal position by a predetermined moving amount; a focal position control device which controls the focal position, so as to include the in-focus position of the main subject determined by the automatic in-focus position determination device and focal positions followed and preceded by the in-focus position; a blur amount calculation device which calculates a blur amount according to pixel coordinates from the plurality of images photographed by the focus bracket photography device, including an image photographed at the in-focus position of the main subject and images photographed at the focal positions followed and preceded by the in-focus position of the main subject; a blurring process device which performs blurring process on one frame of a reference image selected from the plurality of images according to a predetermined criteria, on the basis of the calculated blur amount; and a recording device which records the reference image which is blurring-processed by the blurring process device on a recording medium.

Consequently, it is possible to obtain a blur-emphasized image. In addition, since blur is emphasized on the basis of the reference image only, a change in blur becomes smooth, thereby enabling an even more naturally blurred image to be obtained.

Preferably, the focal position control device controls the focal position on the basis of at least one of an aperture and a focal distance at the time of photographing.

Consequently, it is possible to carry out focus bracket photography according to a depth of field.

Preferably, the image pickup apparatus according to the second aspect may further comprise a sharpness calculating device which calculates sharpness of pixels at corresponding coordinates among the plurality of images, in which the blur amount calculation device calculates the blur amount on the basis of the calculation result of the sharpness calculating device.

Consequently, it is possible to blur areas desired to be blurred with an appropriate blur amount and to obtain an intended blur-emphasized image.

The image pickup apparatus according to the second aspect may further comprise a blur emphasis degree setting device which sets a blur emphasis degree, in which the blur amount calculation device calculates a blur amount according to the blur emphasis degree set by the blur emphasis degree setting device.

Consequently, it is possible for a user to photograph a blur-emphasized image having a blur amount according to the user's preferences.

Preferably, the reference image is an image photographed at the focused position of the main subject.

Consequently, it is possible to obtain a blur-emphasized image focused only on the main subject.

Preferably, the blurring process device produces a smoothed image from the reference image using a lowpass filter which causes the blur amount to become larger as a cutoff frequency becomes lower.

Consequently, it is possible to easily obtain a blur-emphasized image.

Preferably, the blur amount calculation device calculates the blur amount, so as to make the blur amount larger with the increase of a difference between the focal position of an image having the highest sharpness and the focal position of the reference image.

To achieve the object, an image processing apparatus according to a third aspect of the present invention comprises: an input device which inputs a plurality of images of an identical scene respectively photographed at different focal positions, including an image photographed at an in-focus position of a main subject and images photographed at focal positions followed and preceded by the in-focus position of the main subject; an image synthesis device which synthesizes the plurality of images; and an output device which outputs an image obtained by the image synthesis device.

Consequently, it is possible to obtain a blur-emphasized image.

To achieve the object, an image processing apparatus according to a fourth aspect of the present invention comprises: an input device which inputs a plurality of images of an identical scene respectively photographed at different focal positions, including an image photographed at an in-focus position of a main subject and images photographed at focal positions followed and preceded by the in-focus position of the main subject; a focal position control device which controls the focal position, so as to include the in-focus position of the main subject determined by the automatic in-focus position determination device and focal positions followed and preceded by the in-focus position; a blur amount calculation device which calculates a blur amount according to pixel coordinates from the plurality of images photographed by the focus bracket photography device, including an image photographed at the in-focus position of the main subject and images photographed at the focal positions followed and preceded by the in-focus position of the main subject; a blurring process device which performs blurring process on one frame of a reference image selected from the plurality of images according to a predetermined criteria, on the basis of the calculated blur amount; and an output device which outputs the reference image blurring processed by the blurring process device.

Consequently, it is possible to obtain a blur-emphasized image. In addition, since blur is emphasized on the basis of the reference image only, a change in blur becomes smooth, thereby enabling an even more naturally blurred image to be obtained.

To achieve the aforementioned object, an image pickup method according to a fifth aspect of the present invention comprises: an automatic in-focus position determination step of determining an in-focus position of a main subject on the basis of image data; a focus bracket photography step of obtaining a plurality of images by successively photographing images while discretely moving a focal position by a predetermined moving amount; a focal position control step of controlling the focal position, so as to include the in-focus position of the main subject determined by the automatic in-focus position determination step and focal positions followed and preceded by the in-focus position of the main subject; an image synthesis step of synthesizing the plurality of images photographed by the focus bracket photography step, including an image photographed at the in-focus position of the main subject and images photographed at the focal positions followed and preceded by the in-focus position of the main subject; and a recording step of recording an image obtained by the image synthesis step on a recording medium.

Consequently, it is possible to obtain a blur-emphasized image.

To achieve the aforementioned object, an image pick-up method according to a sixth aspect of the present invention, comprises: an automatic in-focus position determination step of determining an in-focus position of a main subject on the basis of image data; a focus bracket photography step of obtaining a plurality of images by successively photographing images while discretely moving a focal position by a predetermined moving amount; a focal position control step of controlling the focal position, so as to include the in-focus position of the main subject determined by the automatic in-focus position determination step and focal positions followed and preceded by the in-focus position of the main subject; a blur amount calculation step of calculating a blur amount according to pixel coordinates from the plurality of images photographed by the focus bracket photography step, including an image photographed at the in-focus position of the main subject and images photographed at the focal positions followed and preceded by the in-focus position of the main subject; a blurring process step of performing blurring process on one frame of a reference image selected from the plurality of images according to a predetermined criteria, on the basis of the calculated blur amount; and a recording step of recording the reference image blurring-processed by the blurring process step on a recording medium.

Consequently, it is possible to obtain a blur-emphasized image. In addition, since blur is emphasized on the basis of the reference image only, a change in blur becomes smooth, thereby enabling an even more naturally blurred image to be obtained.

To achieve the aforementioned object, an image processing method according to a seventh aspect of the present invention comprises: an input step of inputting a plurality of images of an identical scene respectively photographed at different focal positions, including an image photographed at an in-focus position of a main subject and images photographed at focal positions followed and preceded by the in-focus position of the main subject; an image synthesis step of synthesizing the plurality of images; and an output step of outputting an image obtained by the image synthesis step.

Consequently, it is possible to obtain a blur-emphasized image.

To achieve the aforementioned object, an image processing method according to an eighth aspect of the present invention comprises: an automatic in-focus position determination step of determining an in-focus position of a main subject on the basis of image data; a focus bracket photography step of obtaining a plurality of images by successively photographing images while discretely moving a focal position by a predetermined moving amount; a focal position control step of controlling the focal position, so as to include the in-focus position of the main subject determined by the automatic in-focus position determination step and focal positions followed and preceded by the in-focus position of the main subject; a blur amount calculation step of calculating a blur amount according to pixel coordinates from the plurality of images photographed by the focus bracket photography step, including an image photographed at the in-focus position of the main subject and images photographed at the focal positions followed and preceded by the in-focus position of the main subject; a blurring process step of performing blurring process on one frame of a reference image selected from the plurality of images according to a predetermined criteria, on the basis of the calculated blur amount; and recording step of recording the reference image blurring-processed by the blurring process step on a recording medium.

Consequently, it is possible to obtain a blur-emphasized image. In addition, since blur is emphasized on the basis of the reference image only, a change in blur becomes smooth, thereby enabling an even more naturally blurred image to be obtained.

According to the present invention, it is possible to obtain a blur-emphasized image more natural than an ordinarily photographed image. Consequently, it is possible to provide an image pickup apparatus, an image processing apparatus, an image pickup method and an image processing method for obtaining such a naturally blurred image with a shallow depth-of-field as is photographed by a single-lens reflex camera provided with a large image pickup element, by using a camera provided with a small image pickup element like a compact camera.

BRIEF DESCRIPTION OF THE DRAWINGS

FIG. 12 is a block diagram for illustrating one example of the internal configuration of digital camera in accordance with a third embodiment of the present invention;

DETAILED DESCRIPTION OF THE PREFERRED EMBODIMENTS

Hereinafter, embodiments of the present invention will be described with reference to the accompanying drawings.
<First Embodiment>

Figure 1:
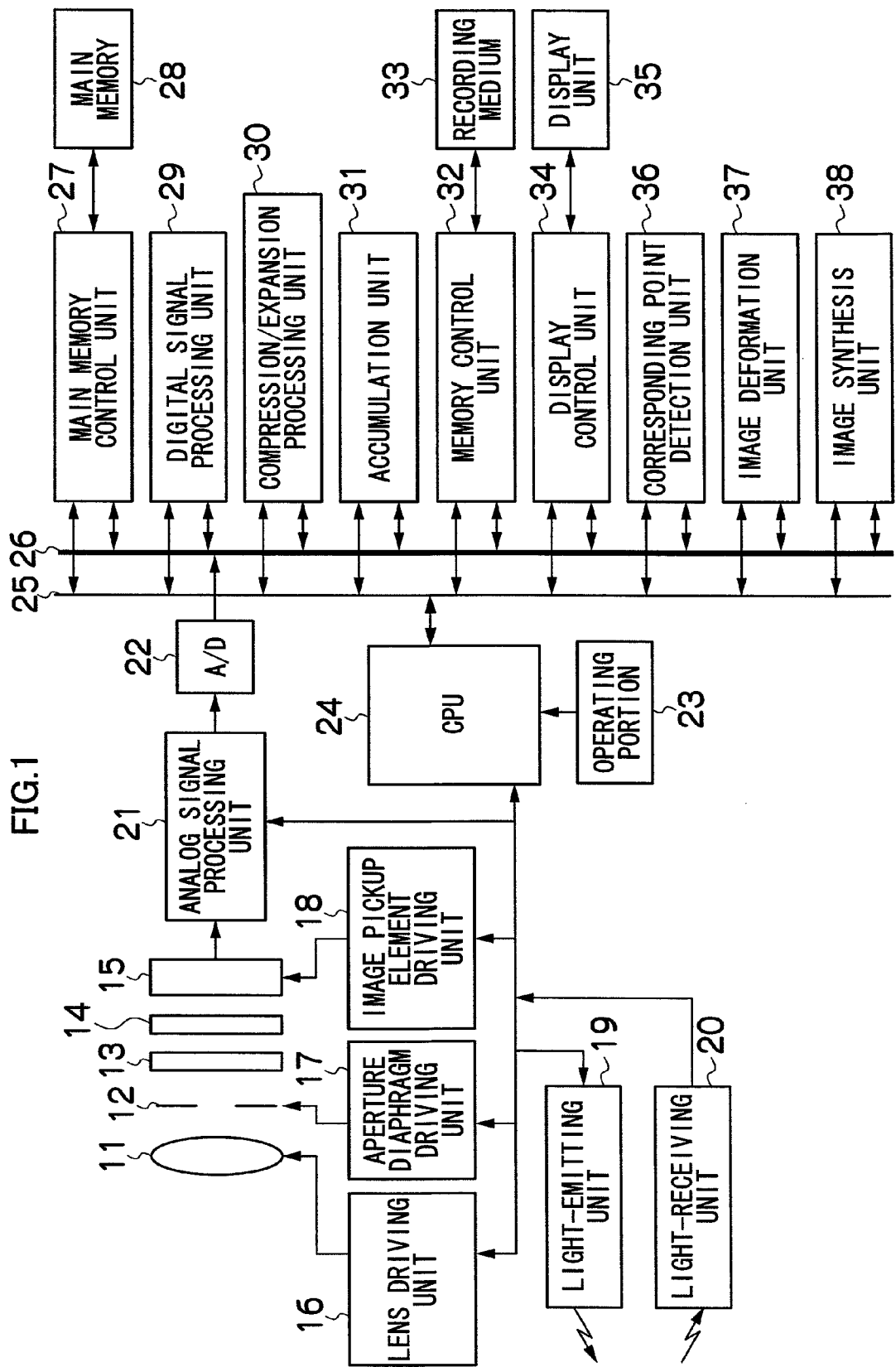
FIG. 1 is a block diagram for illustrating an example of the internal configuration of a digital camera in accordance with a first embodiment of the present invention.

FIG. 1 is a block diagram for illustrating an example of the internal configuration of a digital camera 1 in accordance with a first embodiment of the present invention.

A CPU 24 is configured to comprehensively control respective circuits within the digital camera 1 on the basis of an input from an operating portion 23, including a shutter switch, and performs processing according to a camera control program.

Control of the respective circuits by this CPU 24 is performed through an address bus 25 and a data bus 26. In addition, the CPU 24 exchanges necessary data with a main memory 28. The interior portion of the main memory 28 is partitioned into a ROM area and a RAM area. In this ROM area, there are recorded, for example, a camera control program, a start-up opening image, a shut-down ending image, a GUI image such as a menu image used for the operation of the digital camera 1, a screen saver image, an image of progress status during processing (for example, a sand-clock image with a changing scale mark), key operation sound (e.g., shutter sound), alarm sound, and voice data descriptive of error sound or the like.

When the digital camera 1 is turned on, the CPU 24 detects this operation. After displaying the opening image stored in the ROM area of the main memory 28 on a display unit 35 for a certain period of time, the CPU 24 places the digital camera 1 in a standby state in a photographing mode. In this photographing standby mode, the CPU 24 displays a moving image (through-image) on the display unit 35.

A user (photographer) performs framing, confirms a subject desired to be photographed, checks an image after photographing, and sets photographing conditions, while watching the pass-through display image (live image) displayed on the display unit 35.

When a shutter switch (not shown) of the operating portion 23 is pressed in the photographing standby state, the CPU 24 determines an in-focus position on the basis of an AF evaluation value calculated by an accumulation unit 31. Thus, the CPU 24 performs focus control by driving a lens 11 through a lens driving unit 16, performs exposure control by driving an aperture diaphragm 12 through an aperture diaphragm driving unit 17, and forms an image on the light-receiving surface of a solid-state image pickup element 15 through a lens 11, the aperture diaphragm 12, an Ir cutoff filter 13 and an optical lowpass filter 14. At this time, a stroboscope 19 is flashed to emit photographing auxiliary light, if necessary. Also at this time, the emitted light quantity of the stroboscope 19 is controlled by a light-receiving unit 20. The subject image formed on the light-receiving surface of the solid-state image pickup element 15 is converted to a signal charge appropriate for the light quantity of the subject image. This signal charge is transferred to an analog signal processing unit 21 on the basis of a driving pulse provided by an image pickup element driving unit 18 in accordance with the command of the CPU 24. After being subjected to correlated double sampling at this analog signal processing unit 21, the signal charge is amplified and applied to an A/D converter 22.

Dot-sequential R, G and B signals obtained by converting the signal charge to digital signals by the A/D converter 22 are stored in the RAM area of the main memory 28 through a main memory control unit 27.

A digital signal processing unit 29 reads raw R, G and B data stored in the RAM area of the main memory 28, performs white balance adjustment by applying a digital gain appropriate for the type of light source to these data items, and generates the R, G and B signals by performing gamma (gradation conversion) processing, sharpness processing, and the like. In addition, the digital signal processing unit 29 performs YC signal processing to generate a brightness signal Y and chroma signals Cr and Cb (YC signal) and stores the signals again in the RAM area of the main memory 28.

The YC signal stored in the RAM area of the main memory 28 as described above is compressed into a predetermined format by a compression/expansion processing unit 30, and then recorded through a memory control unit 32 on a recording medium 33 freely attachable to and detachable from the digital camera 1.

When the operating portion 23 is operated to select a replay mode, the image file of a last frame recorded on the recording medium is read through the memory control unit 32. The compressed data of this read image file is expanded by the compression/expansion processing unit 30 into an uncompressed YC signal. The expanded YC signal is converted to a signal format for display and is output to the display unit 35. Consequently, the image of the last frame recorded on the recording medium is displayed on the display unit 35.

Figure 2:
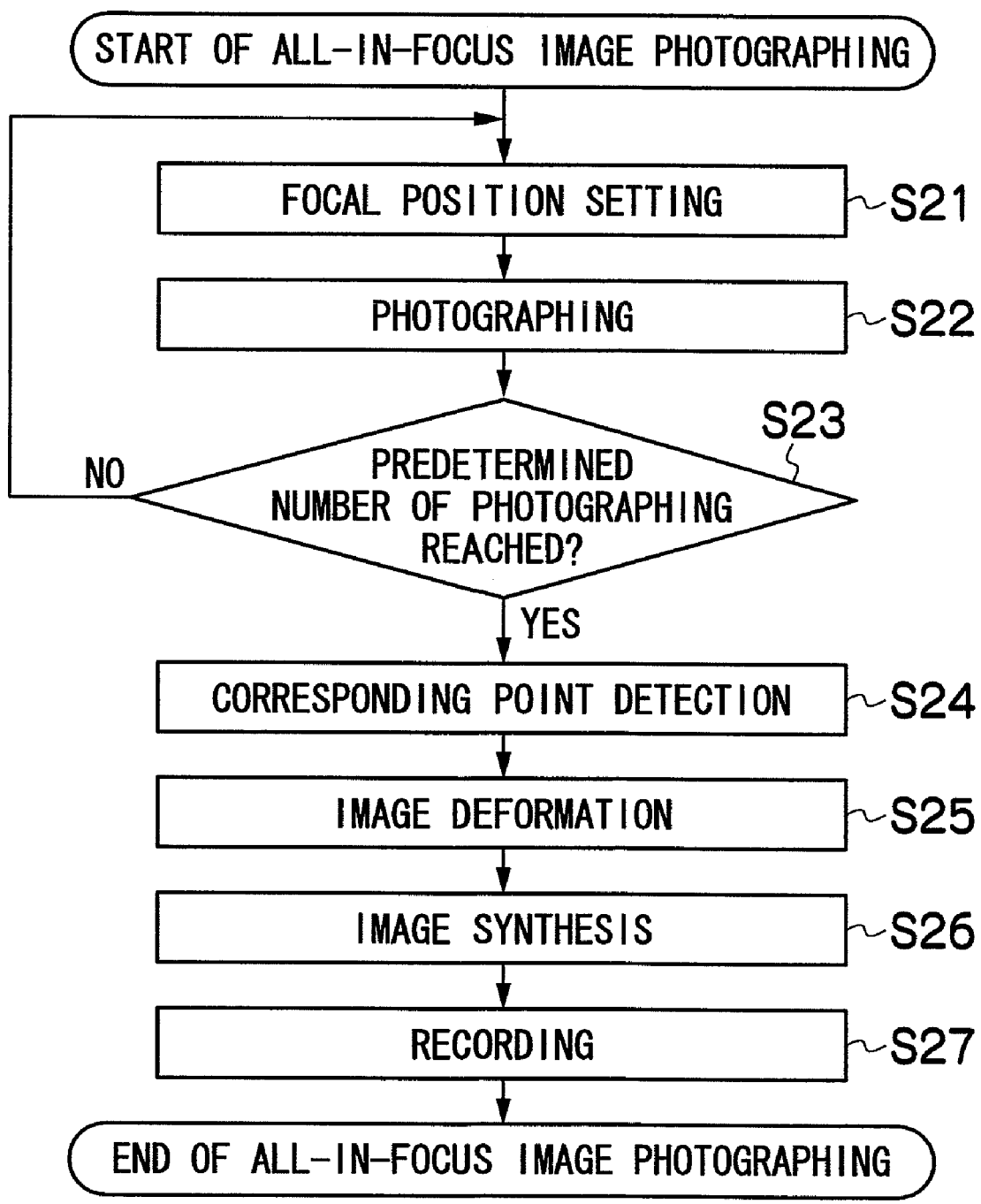
FIG. 2 is a flowchart for showing the operation of an all-in-focus (omnifocal) image photographing mode for photographing an all-in-focus image.

Next, an all-in-focus (ominifocal) image photographing mode in the digital camera 1 will be described. FIG. 2 is a flowchart for showing the operation of an all-in-focus image photographing mode for photographing an all-in-focus image. In the all-in-focus image photographing mode of the digital camera 1 in accordance with the present invention, focus bracket photography is performed, the corresponding points of respective photographed images are detected, the respective photographed images are deformed so that the positions of the corresponding points agree with each other, and an all-in-focus image is obtained by synthesizing the deformed images.

The all-in-focus image photographing mode is set by operating a mode switch (not shown) of the operating portion 23. In addition, when the shutter switch of the operating portion 23 is pressed, the CPU 24 sets a focal position on the basis of these operations (step S21) and performs photographing (step S22). Then, the CPU 24 determines the number of photographing (step S23). If the number of photographing does not reach to a predetermined number, the CPU 24 sets a different focal position (step S21), and further performs photographing (step S22). The CPU 24 repeats photographing at different focal positions in this way, until the number of the photographing reaches to the predetermined number (focus bracket photography). Each photographed image is stored in the RAM area of the main memory 28.

Note here that the predetermined number of photographing may be set within the digital camera 1 in advance, or may be set by a user. Alternatively, a depth of field dependent on photographing conditions may be determined and the frequency may be decided according to this depth of field. In order to obtain an all-in-focus image, every subject within any one of images must be in focus. Hence, if the depth of field is small, it is necessary to decrease the moving amount of focal position and increase the number of photographed images. Alternatively, if the depth of field is large, it is possible to prevent the waste of memory resources or the increase of processing load caused by uselessly photographing a large number of images, by increasing the moving amount of focal position and decreasing the number of photographed images.

Also note that the focal position may be moved from a position having a shorter focal distance to a position having a longer focal distance or vice versa, or may be moved at random.

Upon completion of the predetermined number of photographing, the CPU 24 detects corresponding points in each photographed image (step S24).

Figure 3B:
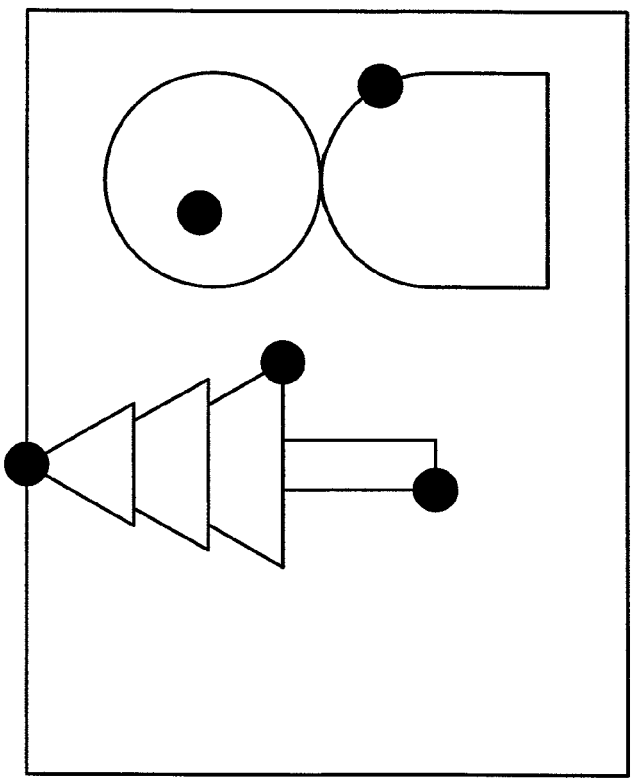
FIGS. 3A and 3B are schematic views for illustrating images obtained by focus bracket photography.
Figure 3A:
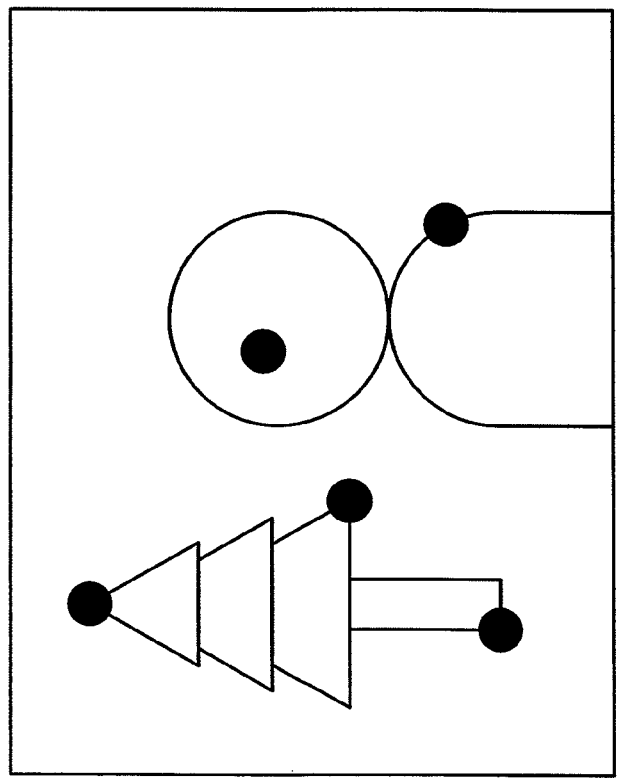
Figure 4:
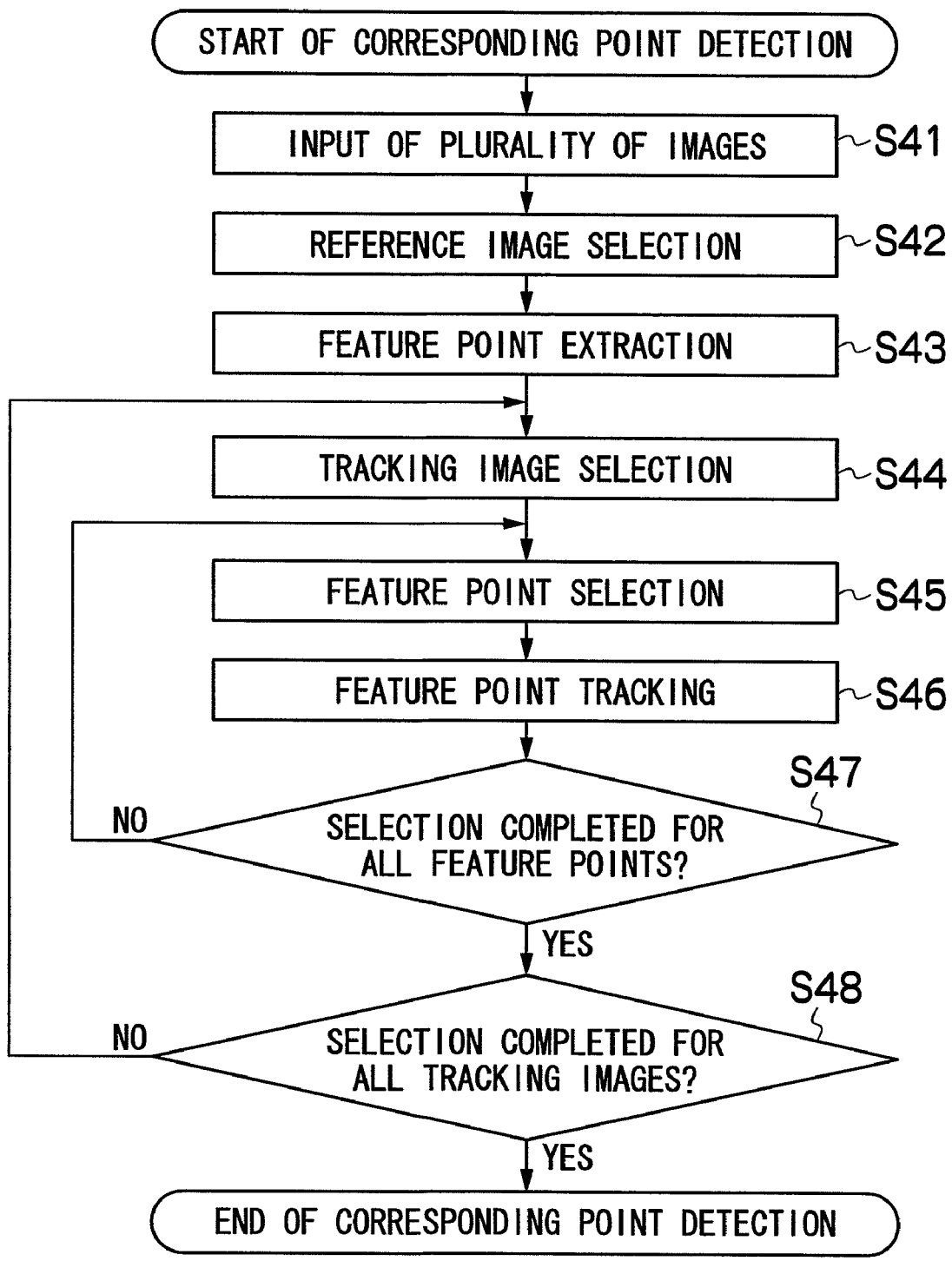
FIG. 4 is a flowchart for showing the operation of a digital camera to detect corresponding points.

Now, the detection of corresponding points in images will be described. Corresponding point detection evaluates the positional relationship of corresponding points among a plurality of images. FIGS. 3A and 3B are schematic views for illustrating images obtained by focus bracket photography. A corresponding point detection unit 36 extracts feature points from a reference image shown in FIG. 3A. Then, the corresponding point detection unit 36 detects these feature points by keeping track thereof to determine to which positions in a tracking image shown in FIG. 3B the feature points have moved. FIG. 4 is a flowchart for showing the operation of a digital camera 1 to detect corresponding points.

First, the CPU 24 inputs a plurality of images obtained by focus bracket photography to a corresponding point detection unit 36 (step S41). Next, the corresponding point detection unit 36 selects a reference image from this plurality of images (step S42), and extracts feature points from the reference image (step S43). The reference image may be selected on the basis of a method previously specified within the digital camera 1 or may be selected by a user. Here, an image photographed first is defined as the reference image. While various methods have been proposed as methods for extracting feature points, it is assumed here that when the standard deviation of brightness within a predetermined area centered on a certain point is greater than a predetermined value, the point is extracted as a feature point. The black dots in FIG. 3A denote feature points in the image shown in FIG. 3A. Although subsequent processes can be carried out more precisely with the increase of feature points, processing load increases depending on the number of feature points. Accordingly, the number of feature points should be determined as appropriate, depending on hardware performance.

Next, a tracking image is selected (step S44). As the tracking image, an image other than the reference image is selected from among the plurality of images input in step S41.

In the selected tracking image, one of the feature points extracted from the reference image is selected (step S45) to keep track of the feature point to determine to which position the feature point has moved (step S46). Various methods have also been proposed as tracking methods. Here, a method for finding coordinates at which a cross-correlation coefficient within a predetermined area centered on that feature point is minimum (block matching method) is used to perform tracking. Note that since focus bracket photography is performed in the present invention, it is possible to predict a direction in which a corresponding point moves and the amount of move due to the move of the focal position. The move of a corresponding point due to the move of the focal position is a move from the center of a screen to a radial direction, or vice versa. This moving direction can be predicted from the moving direction of the focal position. The amount of move can also be predicted from the moving amount of the focal position. Accordingly, it is possible to improve the function of corresponding point detection, both in accuracy and speed, by detecting corresponding points in consideration of these matters.

Upon completion of feature point tracking, a determination is made of whether processing has been performed on all feature points (step S47). If there is a feature point not yet processed, the CPU 24 selects that feature point (step S45) and keeps track thereof (step S46). In this way, the CPU 24 performs tracking for all feature points.

Upon completion of processing on all feature points, the CPU 24 determines whether or not this processing has been performed on all tracking images (step S48). As described earlier, this processing is performed on images other than the reference image. If there are any unprocessed tracking images, the same processing is performed on these tracking images (steps S44 to S47). Upon completion of processing on all tracking images, corresponding point detection processing terminates.

Figure 5A:
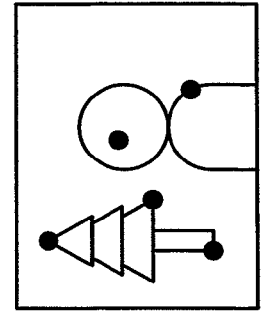
FIGS. 5A to 5E are schematic views for illustrating image deformations.
Figure 5B:
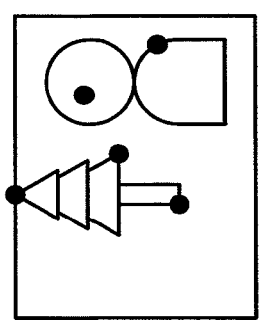
Figure 5C:
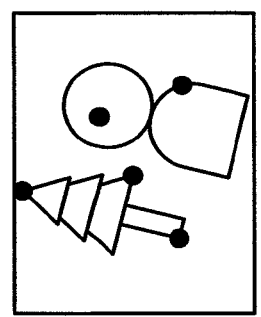
Figure 5D:
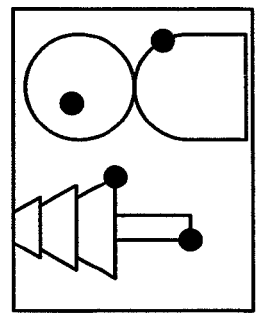

Upon completion of the corresponding point detection processing, the CPU 24 performs image deformation (step S25). In this image deformation processing, an image deformation unit 37 deforms the tracking images, so that the positions of corresponding points in each tracking image obtained by corresponding point detection processing agree as much as possible with the positions of corresponding points in the reference image. FIGS. 5A to 5E are schematic views for illustrating image deformations. If respective corresponding points are displaced parallel, as shown in FIG. 5B, with respect to a reference image shown in FIG. 5A, then parallel displacement is performed. If the respective corresponding points are rotationally displaced, as shown in FIG. 5C, then rotational displacement is performed. If the respective corresponding points are enlarged (or shrunk), as shown in FIG. 5D, shrinkage (or enlargement) is performed. For these image deformations, displacement vectors may be determined so that the total sum of the distances of plural corresponding point pairs becomes minimum. Note that these parallel displacement, rotational displacement, enlargement processing and shrinkage processing are performed by means of affine transformation.

Figure 5E:
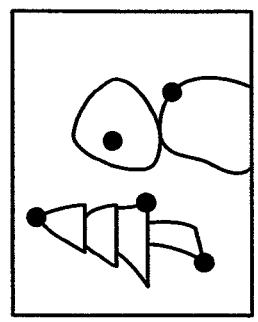

If there are any complex changes between the reference image and the tracking image, as shown in FIG. 5E, warping is performed in order to make all corresponding points even more precisely agree with each other. In warping, displacement vectors are selected so as to cause all corresponding point pairs agree with each other, and additionally, points around the corresponding points are evaluated by means of interpolation.

Figures 6, 7:
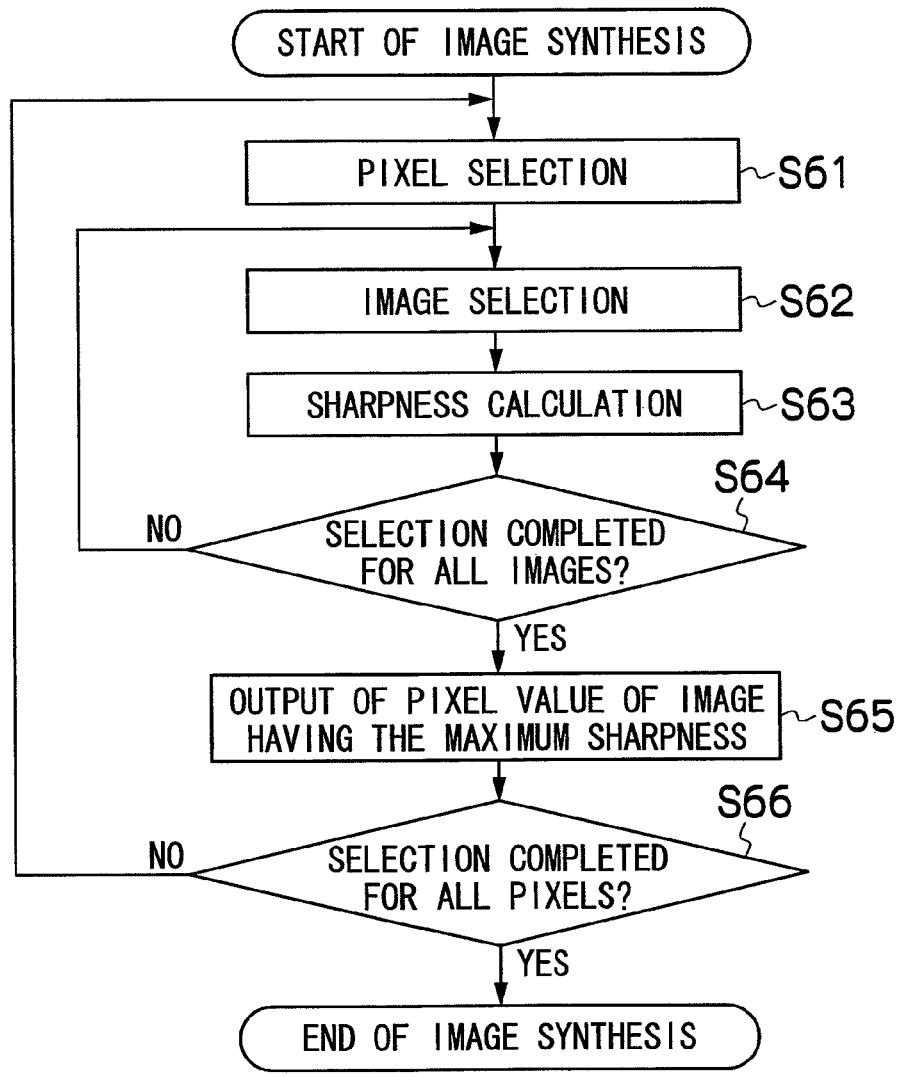
FIG. 6 is a flowchart for showing the operation of image synthesis process.
FIG. 7 is a table for showing a Laplacian filter matrix.

Image synthesis is performed on a plurality of images in which the positions of corresponding points have been made to agree as much as possible with each other as described above (step S26). FIG. 6 is a flowchart for showing the operation of image synthesis process. In image synthesis process, the pixel values of an image having the highest sharpness, i.e., the most in-focus image, are selected from among a plurality of images and synthesized. Thus, an image having a high level of sharpness in every position within the screen, i.e., an all-in-focus image is obtained as a final image.

First, an image synthesis unit 38 selects a pixel to be processed (step S61). This pixel selection may be made in sequence from an edge of the screen or may be made in another sequence. Next, an image is selected (step S62) and the sharpness of the pixel selected in step S61 in the selected image is calculated (step S63).

The sharpness is calculated by calculating the absolute value of an output value provided by Laplacian filer process. FIG. 7 is a table for showing a Laplacian filter matrix. Edge detection can be achieved by performing Laplacian filer process and the absolute value of an output value thus obtained represents the sharpness. Image blur and sharpness are in the relationship that sharpness becomes higher with the decrease of image blur and becomes lower with the increase of image blur. Note that the kernel of a Laplacian filter is not limited to this example. In addition, a sharpness calculation filter other than the Laplacian filter may be used.

Next, a determination is made of whether a sharpness calculation has been made for all images (step S64). If there are any images the sharpness of which has not yet been calculated, an image selection is made once again (step S62) and the sharpness of the pixel selected in step S61 in the selected image is calculated (step S63). In this way, the sharpness of the pixels selected in step S61 is calculated for all images.

Next, the pixel value of an image having the highest sharpness is output (step S65). A comparison is made between the absolute values of out values calculated in step S63 in the Laplacian filer process of pixels selected in step S61 in each image. The pixel value of an image having the largest absolute value is employed as an output pixel. Alternatively, a weighted average may be calculated by placing a larger weight on the pixel values of images having high degrees of sharpness and the weighted average may be output.

The processing described above is performed on all pixels. A determination is made of whether or not the processing has been performed on all pixels (step S66) and, if the processing has been completed for all pixels, image synthesis process terminates.

When image synthesis process terminates, the CPU 24 records an output image provided by the image synthesis unit 38 on the recording medium 33 through the memory control unit 32. Thus, the operation of the all-in-focus image photographing mode terminates (step S27).

The output image provided by this image synthesis unit 38 may only be displayed on the display unit 35 through the display control unit 34, without being stored in the recording medium 33. Alternatively, the output image may be displayed on an external monitor using an external interface (not shown), or may be output from a printer or the like as a printed matter.

As described above, it is possible to obtain an all-in-focus image even if subject shakes or camera shakes are involved.

Methods of extracting feature points, keeping track of feature points, deforming images, and calculating the sharpness of pixels are not limited to the methods of the present embodiment, but any other methods may be used.

<Second Embodiment>

Figure 8:
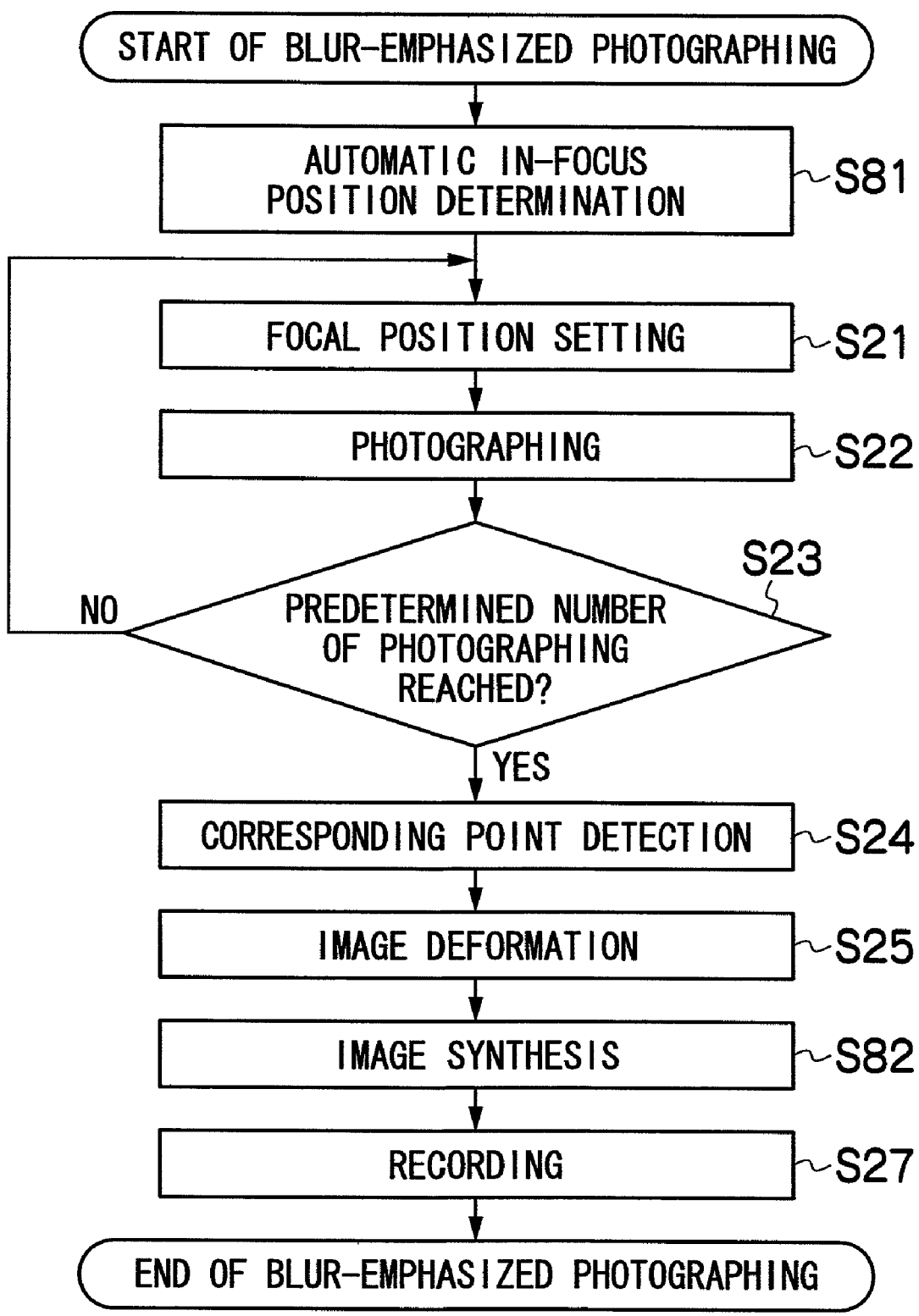
FIG. 8 is a flowchart for showing the operation of a blur-emphasized photographing mode.

Next, blur-emphasized photographing in a digital camera 1 will be described. FIG. 8 is a flowchart for showing the operation of a blur-emphasized photographing mode for photographing a blur-emphasized image. Note that parts identical to those of the flowchart shown in FIG. 2 are denoted by like symbols and will not be explained in detail again.

In the blur-emphasized image photographing mode of a digital camera 1 in accordance with the present invention, focus bracket photography is performed using auto-focusing, including photographing at the in-focus position of a main subject and at focal positions followed and preceded by the in-focus position. Then, the corresponding points of each photographed image are detected and each photographed image is deformed so that the positions of the corresponding points agree with each other. The deformed images are synthesized to obtain a blur-emphasized image.

First, the digital camera 1 is set to a blur-emphasized image photographing mode by operating the mode switch of an operating portion 23. Next, when the shutter button of the operating portion 23 is pressed, an automatic in-focus position determination (AF) is made on a main subject (step S81). This AF may be the same as AF performed in normal photographing. That is, the focal position of a lens is driven prior to photographing, AF evaluation values, such as the output value of a band-pass filter, are calculated by an accumulation unit 31 each time the focal position is driven, and a focal position having the highest AF evaluation value is determined by the CPU as the in-focus position.

Figure 9:
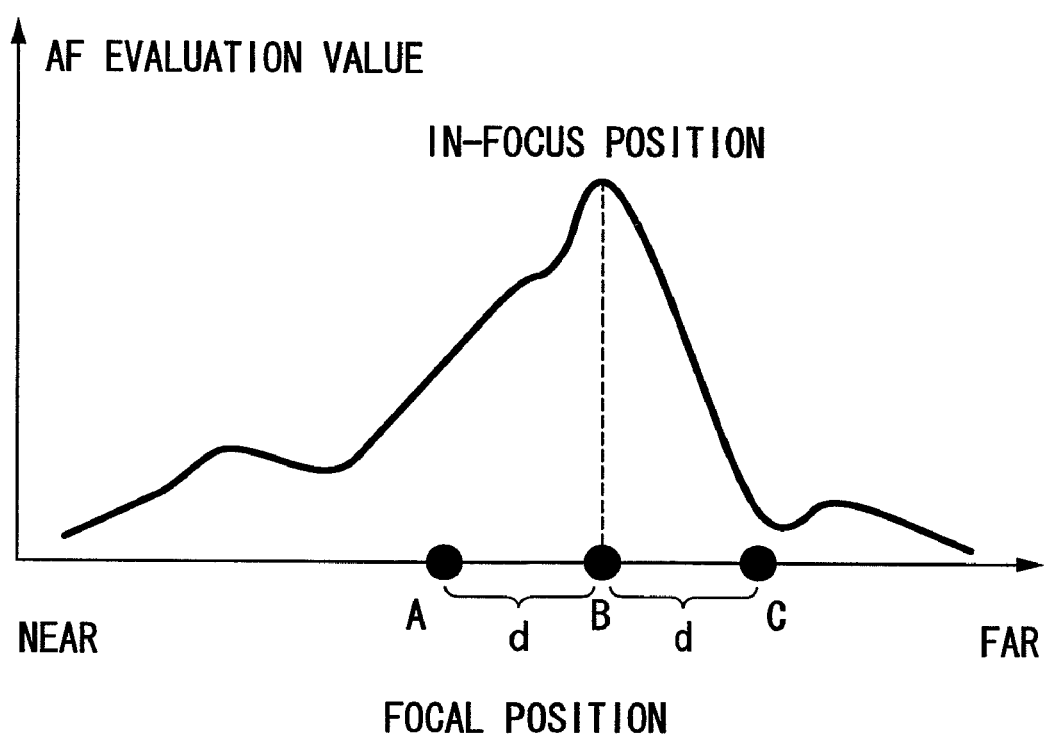
FIG. 9 is a graph for showing respective focal positions and AF evaluation values at the respective focal positions.

In focus bracket photography in the blur-emphasized image photographing mode, photographing is performed while moving a focal position, so as to include the AF in-focus position of a main subject and focal positions followed and preceded by the AF in-focus position of the main subject. FIG. 9 is a graph wherein the horizontal axis represents each focal position of the digital camera 1 and the vertical axis represents an AF evaluation value for a main subject at each focal position. A focal position having the highest AF evaluation value is the in-focus position of the main subject. Assuming that this in-focus position of the main subject is "B", three points, i.e., the in-focus position B and focal positions A and C at a predetermined distance "d" forward and backward from the in-focus position B are defined as focal positions used at the time of photographing in the focus bracket photography of the present embodiment. This distance "d" may be a fixed value previously stored in the digital camera 1 or may be set by a user. Alternatively, a depth of field may be determined and the distance "d" may be varied according to this depth of field. Since the degree of blur differs depending on the depth of field, it is possible to obtain an intended image with an appropriate degree of blur by changing the value of "d" according to the depth of field.

Focus bracket photography is performed using the focal positions defined as described above, as in the all-in-focus image photographing mode of the first embodiment (steps S21 to S23). Each photographed image is stored in the RAM area of the main memory 28.

Upon completion of focus bracket photography, the CPU 24 detects corresponding points in each photographed image (step S24). Here, the reference image is defined as an image photographed at the in-focus position B of the main subject. Corresponding point detection is performed in the same way as in the first embodiment.

Upon completion of corresponding point detection processing, the CPU 24 performs image deformation (step S25). The image deformation is performed in the same way as in the first embodiment.

Figure 10:
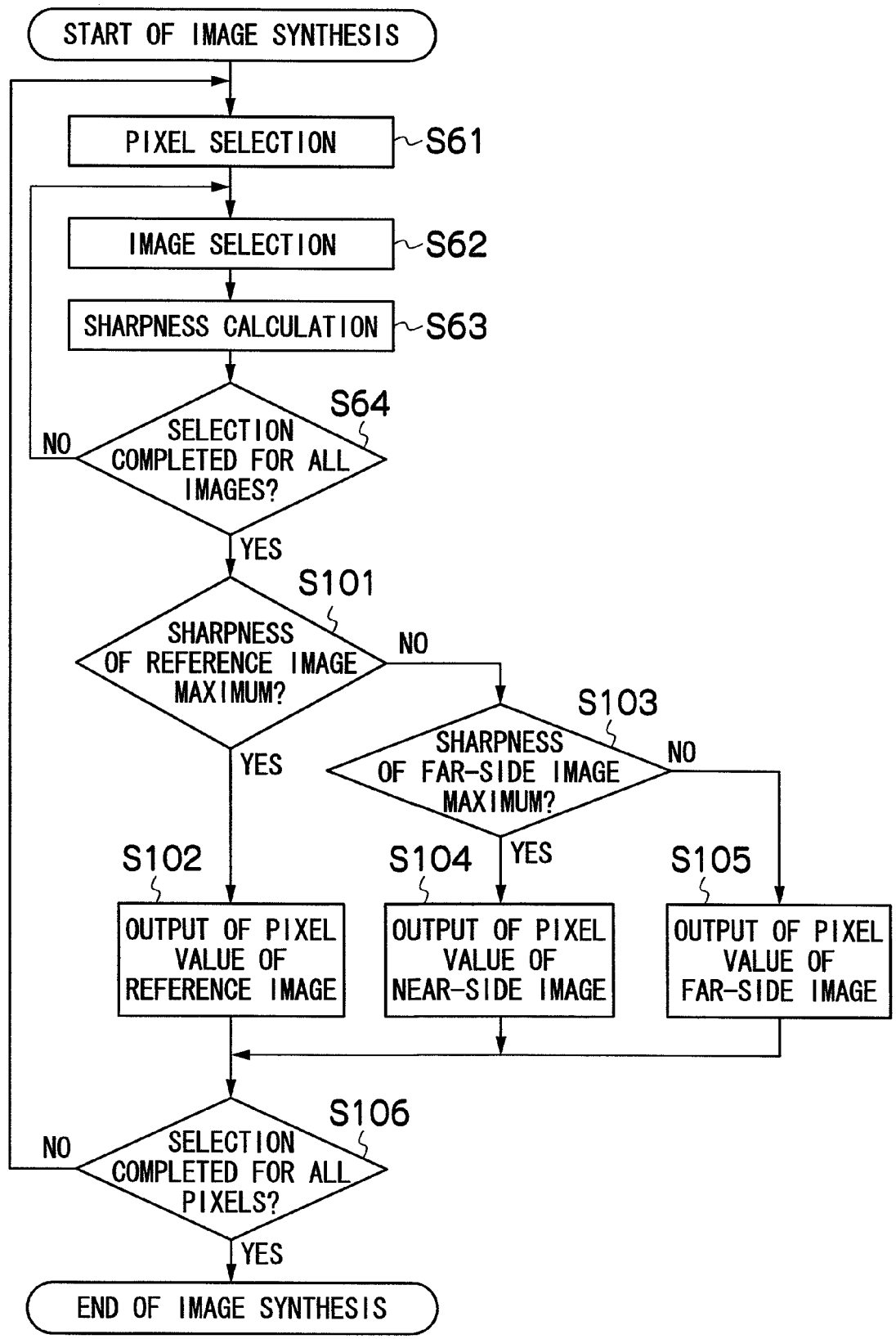
FIG. 10 is a flowchart for showing the operation of image synthesis process in a second embodiment.

Upon completion of image deformation processing, the CPU 24 performs image synthesis. FIG. 10 is a flowchart for showing the operation of image synthesis process in the second embodiment. Note that parts identical to those of the flowchart shown in FIG. 6 are denoted by like symbols and will not be explained in detail again. In the blur-emphasized image photographing mode of the digital camera 1 in accordance with the second embodiment of the present invention, a blur-emphasized image is obtained by selecting pixels of the reference image, among a plurality of images, in image synthesis process if the sharpness of the reference image is highest, or by selecting pixels of an image photographed at a focal position which is symmetrical, with respect to the in-focus position of the main subject, to a focal position at which the sharpness of pixels is highest, if the sharpness of an image other than the reference image is highest.

Figure 11A:
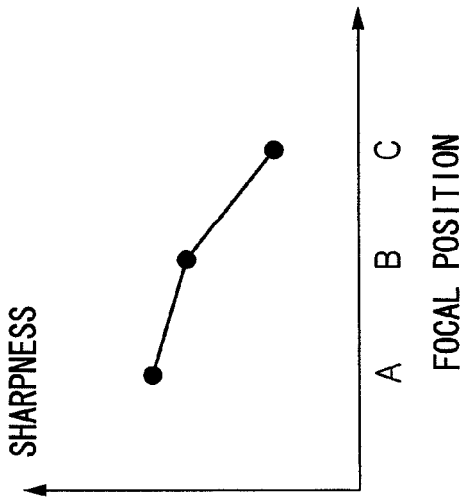
FIGS. 11A, 11B and 11C are graphs for showing the sharpness of images photographed at the in-focus position B of a main subject and images photographed at positions A and C which are focal positions followed and preceded by the in-focus position B.
Figure 11B:
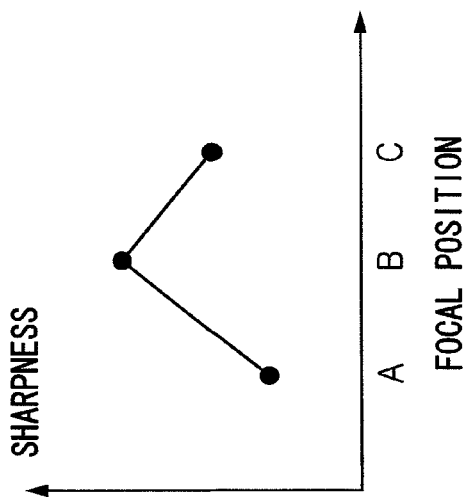
Figure 11C:
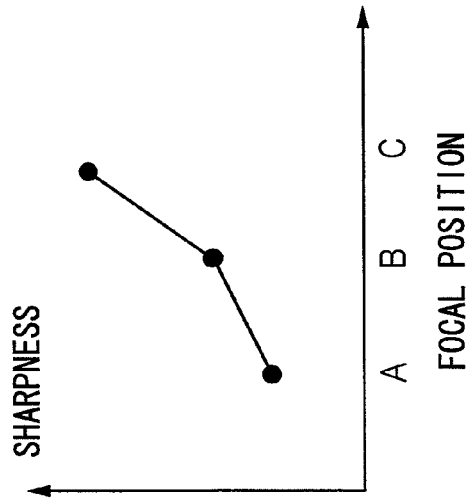

As in the first embodiment, the image synthesis unit 38 selects a pixel to be processed (step S61), calculates the sharpness of the selected pixel in each image (steps S62 to S64). FIGS. 11A, 11B and 11C are graphs for showing the relationship in sharpness among images photographed at the in-focus position B of a main subject and images photographed at positions A and C which are focal positions followed and preceded by the in-focus position B. If three images are photographed by focus bracket photography, the relationship in sharpness among the images photographed at these focal positions A, B and C can be classified into three cases: the case where "C" is a position at which the sharpness is maximum shown in FIG. 11A; the case where "B" is a position at which the sharpness is maximum shown in FIG. 11B; and the case where "A" is a position at which the sharpness is maximum shown in FIG. 11C.

When the sharpness of the selected pixel is calculated for all images (step S64: Yes), a determination is made, on the basis of this calculated sharpness, as to whether or not the sharpness of the reference image is maximum, i.e., whether the sharpness is in the relationship shown in FIG. 11B (step S101). If the sharpness of the reference image is the maximum, the pixel value of the reference image is output (step S102). If the sharpness of the reference image is not maximum, a determination is made of whether or not the sharpness of an image, the focal position of which is farther from the in-focus position of the main subject, is maximum, i.e., whether the sharpness is in the relationship shown in FIG. 11A (step S103). If the sharpness of the image whose focal position is farther from the in-focus position of the main subject is the maximum, the pixel value of an image whose focal position is closer than the in-focus position of the main subject is output (step S104). Inversely, if the sharpness of the image whose focal position is farther from the in-focus position of the main subject is not maximum, the sharpness of an image whose focal position is closer than the in-focus position of the main subject is maximum, i.e., the sharpness is in the relationship shown in FIG. 11C. Thus, the pixel value of the image whose focal position is farther than the in-focus position of the main subject is output (step S105).

This processing is performed on all pixels. When a determination is made that processing on all pixels has been completed (step S106), the image synthesis process terminates.

Upon completion of the image synthesis process, the CPU 24 records an output image provided by the image synthesis unit 38 on the recording medium 33 through the memory control unit 32 (step S27). Thus, blur-emphasized image photographing terminates.

As described above, it is possible to emphasize blur by selecting a pixel value which intensifies blur in the coordinates where the sharpness of a pixel is low in an image photographed at the in-focus position B of the main subject. Even if there are more than three focal positions, a selection may be made, depending on the degree of blur-emphasis, from among a plurality of images at focal positions which are opposite to a focal position having the maximum value of sharpness across an in-focus position of a main subject. That is, if blur is desired to be emphasized further, the pixel value of an image having a lower level of sharpness may be output.

Note that in the present embodiment, focus bracket photography is performed at the in-focus position of the main subject and at focal positions A and C at a distance of "d" from the in-focus position. Alternatively, the focal points A and C may not be symmetrical to each other with respect to the in-focus position B. That is, the distances of the focal points A and C from the in-focus position may be, for example, "d" and "d'" which differ from each other.

The image synthesis process shown in FIG. 10 in the present embodiment may be performed on images not subjected to corresponding point detection and image deformation. That is, this image synthesis process may be directly performed on a plurality of images obtained by focus bracket photography.

<Third Embodiment>

Blur-emphasized photographing in accordance with a third embodiment of the present invention will be described. FIG. 12 is a block diagram for illustrating one example of the internal configuration of a digital camera 1 in accordance with the third embodiment of the present invention. This block diagram differs from the block diagram shown in FIG. 1 only in that a filter processing unit 40 is provided in place of the image synthesis unit 38.

Figure 13:
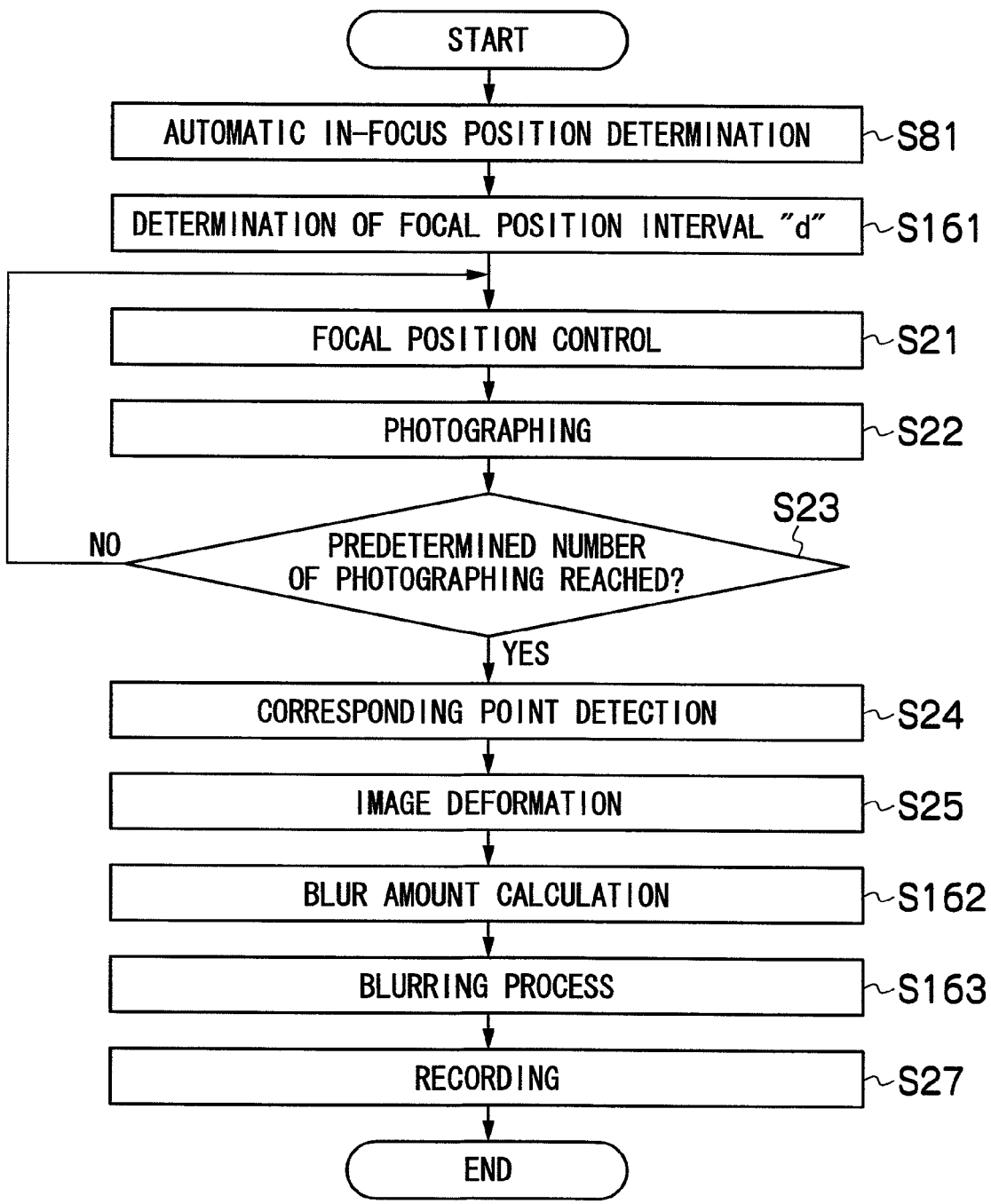
FIG. 13 is a flowchart for showing the operation of a blur-emphasized photographing mode in a third embodiment.

FIG. 13 is a flowchart for showing the operation of the blur-emphasized photographing mode of the digital camera 1. Note that parts identical to those of the flowcharts shown in FIGS. 2 and 8 are denoted by like symbols and will not be explained in detail again. In the blur-emphasized image photographing mode of the digital camera 1 in accordance with the third embodiment of the present invention, focus bracket photography is performed by means of auto-focusing, including photographing at the in-focus position of a main subject and at focal positions followed and preceded by the in-focus position. Then, the corresponding points of each photographed image are detected and each photographed image is deformed so that the positions of the corresponding points agree with each other. The sharpness of each pixel is calculated from the deformed images and filter processing is performed on a reference image using a sharpness-based filter coefficient to obtain a blur-emphasized image.

In the same way as heretofore described, an automatic in-focus position determination is made for a main subject (step S81) and then a focal position interval "d" is determined (step S161), when the shutter button of an operating portion 23 is pressed in a blur-emphasized photographing mode.

Figure 14:
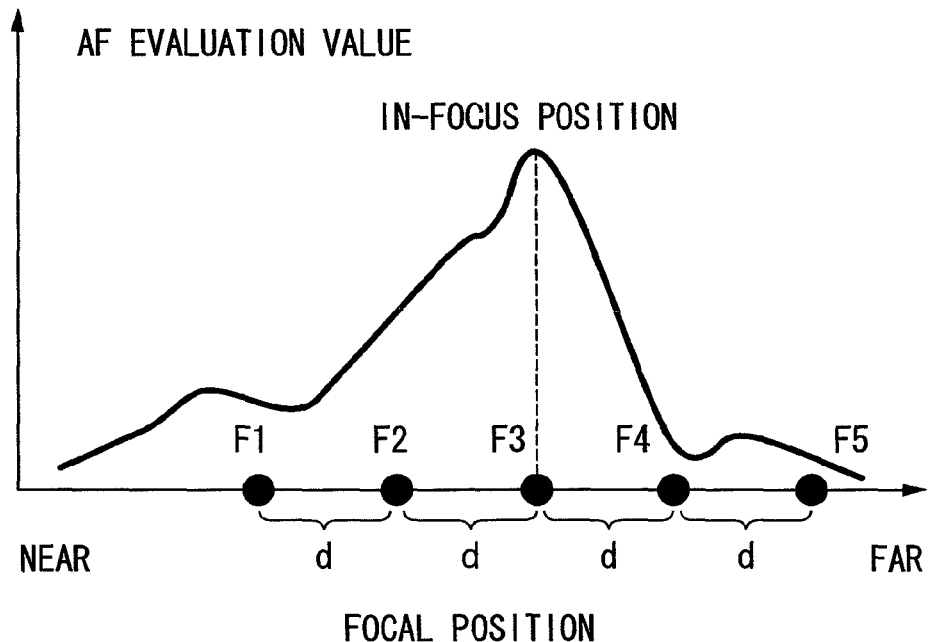
FIG. 14 is a graph for showing respective focal positions and AF evaluation values at the respective focal positions.

In the present embodiment, a focal position set at the time of focus bracket photography is made to include the in-focus position of the main subject and focal positions followed and preceded by the in-focus position. Here, as shown in FIG. 14, a total of five points, i.e., the in-focus position F3 of the main subject, focal positions F2 and F4 away by a focal distance of "d" forward and backward from the in-focus position F3 of the main subject, and focal positions F1 and F5 away by a focal distance of "d" from the focal positions F2 and F4 in a direction away from the in-focus position F3 of the main subject, are defined as focal positions used at the time of photographing. Note that an image photographed at F1 is numbered 1, an image photographed at F2 is numbered 2, . . . , and an image photographed at F5 is numbered 5, in the order from the farthest focal position.

Figure 15:
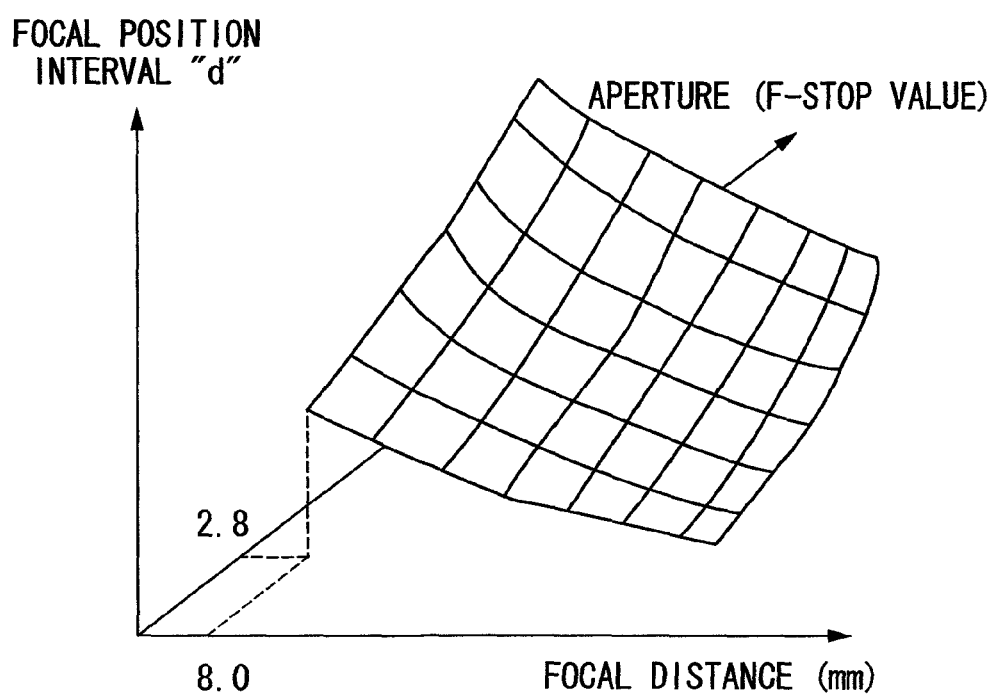
FIG. 15 is a graph for showing the relationship among apertures, focal distances, and an interval "d" between focal positions.

FIG. 15 is a graph in a three-dimensional manner for showing the relationship among apertures, focal distances at the time of photographing and a focal interval "d" between focal positions at the time of focus bracket photography. As shown in the graph, the digital camera 1 is configured to set the focal interval "d" to a small value if the depth of field is small, i.e., the F value of an aperture is small or a focal distance is long. Inversely, the digital camera 1 sets the interval "d" to a large value if the depth of field is large, i.e., the F value of an aperture is large or a focal distance is short. The CPU 24 determines the focal interval "d" on the basis of these settings stored in the ROM area of the main memory 28. Consequently, it is possible to obtain images having different focal points suited for blur emphasis at an arbitrary aperture and focal distance. Note that the focal interval "d" may not be constant but may be made to differ, for example, between a NEAR side and a FAR side as viewed from the in-focus position of the main subject.

After determining the focal interval "d" based on an aperture and a focal distance at the time of photographing as described above, the CPU 24 performs focus bracket photography at the focal positions F1 to F5 (steps S21 to S23). This sequence of photographing may be determined as appropriate. Each photographed image is stored in the RAM area of the main memory 28.

Upon completion of focus bracket photography, the CPU 24 detects corresponding points in each image using an image photographed at the in-focus position of the main subject as a reference image (step S24). Corresponding point detection is performed in the same way as in the first embodiment. Upon completion of corresponding point detection processing, the CPU 24 performs image deformation (step S25).

Figure 16:
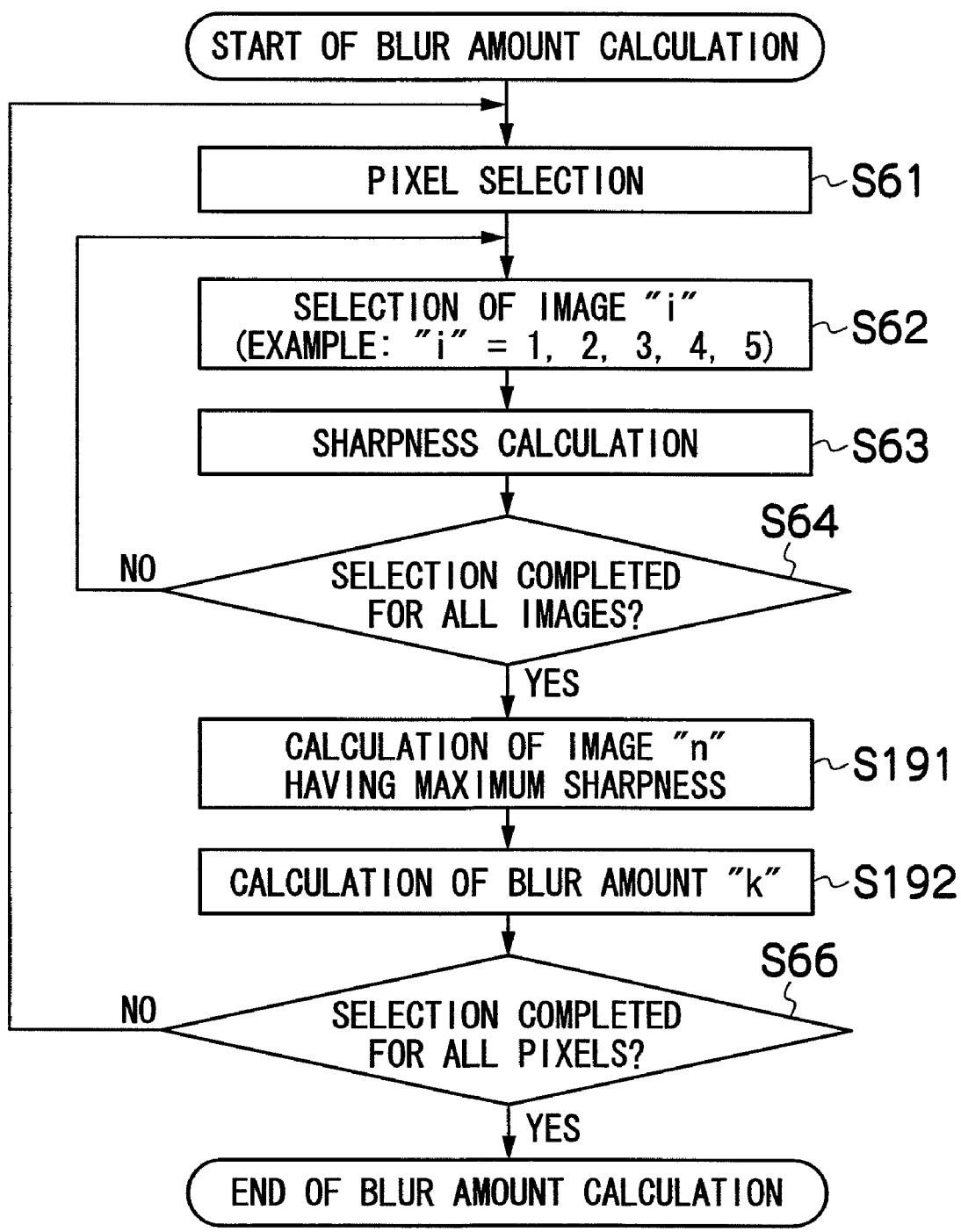
FIG. 16 is a flowchart for showing the operation of blur amount calculation process.

Upon completion of image deformation processing, the CPU 24 calculates a blur amount (step S162). FIG. 16 is a flowchart for showing the operation of blur amount calculation process. Note that parts identical to those of the flowchart shown in FIG. 6 are denoted by like symbols and will not be explained in detail again.

First, a filter processing unit 40 selects a pixel to be processed (step S61). Next, the filter processing unit 40 selects an image (step S62), and calculates the sharpness of the pixel selected in step S61 in the selected image (step S63). The sharpness calculation is made in the same way as in the first embodiment, by calculating the absolute value of an output value provided by Laplacian filter process. The sharpness of the pixel selected in step S61 is calculated for all images.

Upon determination that the sharpness calculation has been completed for all images (step S64), the CPU 24 calculates an image number "n" whose sharpness is maximum (step S191) and calculates a blur amount "k" (step S192).

Assuming here that the image number of an image photographed at the in-focus position of the main subject is "c", then the blur amount "k" is represented by the following equation:

$$k = u \times (n-c) \qquad \text{[Formula 1]}$$

where "u" is a blur emphasis degree specified by a user. If "u" is equal to or larger than 1.0, an image is provided wherein blur is emphasized more than a reference setting. If "u" is smaller than 1.0, an image is provided wherein blur is alleviated below the reference setting. Note that a user can set the blur emphasis degree "u" by operating the operating portion 23. In addition, c=3 in the present embodiment.

The calculation of this blur amount "k" is performed for all pixels. Upon determination that the calculation has been completed for all pixels (step S66), blur amount calculation process terminates.

Figure 17:
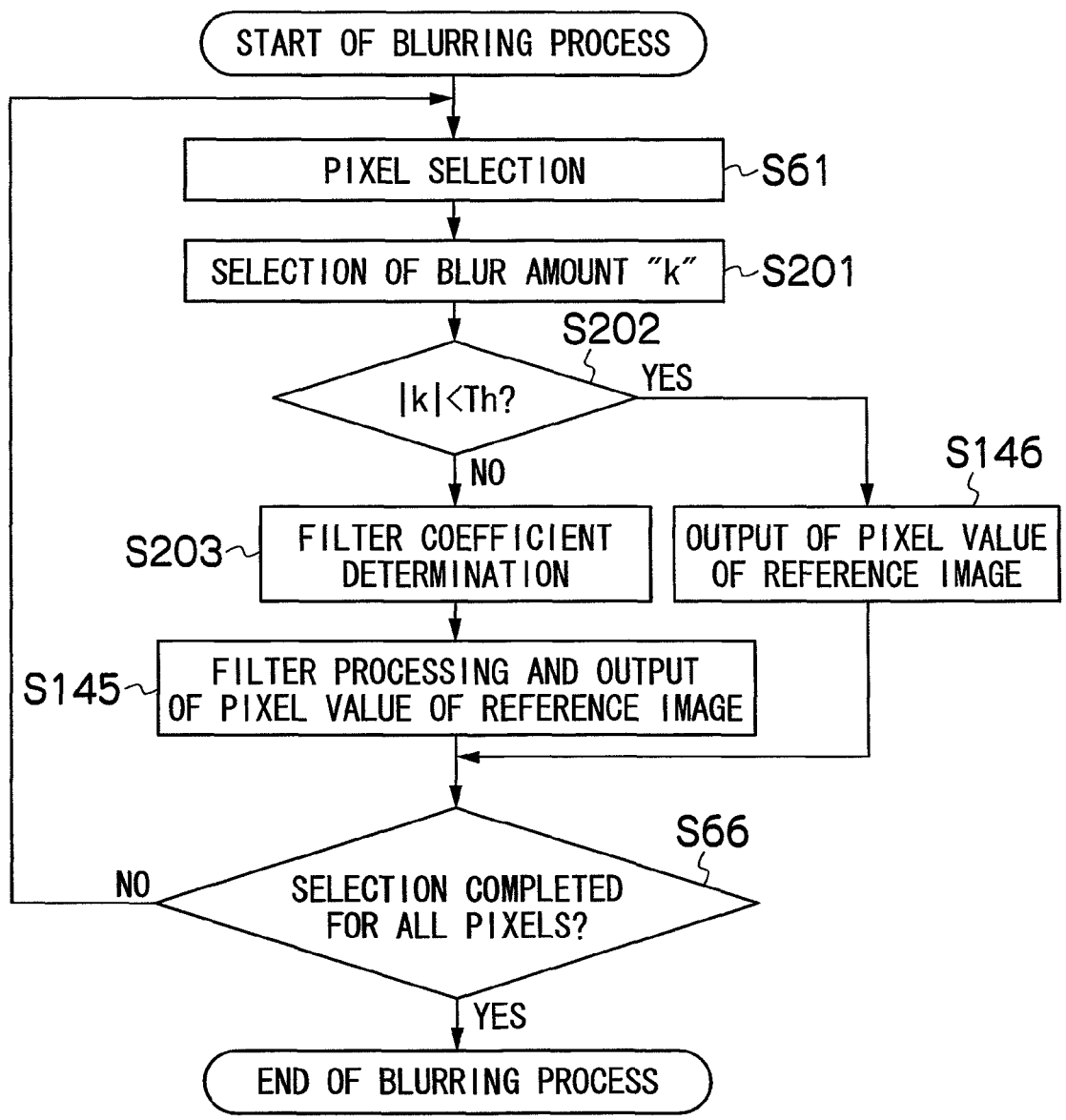
FIG. 17 is a flowchart for showing the operation of blurring process.

Upon completion of the blur amount calculation process, the CPU 24 performs blurring process (step S163). FIG. 17 is a flowchart for showing the operation of blurring process. In the present embodiment, a Gaussian filter is used for blurring process.

First, a filter processing unit 40 selects a pixel (step S61) and selects a blur amount "k" for the selected pixel. Since the blur amount "k" of each pixel calculated in step S192 shown in FIG. 16 is stored in the RAM area of the main memory 28, the filter processing unit 40 reads the blur amount "k".

Next, a comparison is made between the absolute value |k| of the read blur amount and a predetermined threshold "Th" (step S202). If the predetermined threshold "Th" is equal to or larger, the pixel in question is regarded as an in-focus area and the pixel value of an image photographed at the in-focus position F3 of a subject is output (step S146). If the absolute value |k| of the blur amount is larger, a filter coefficient is determined by regarding the pixel in question as an area to be blur-emphasized (step S203).

Figure 18B:
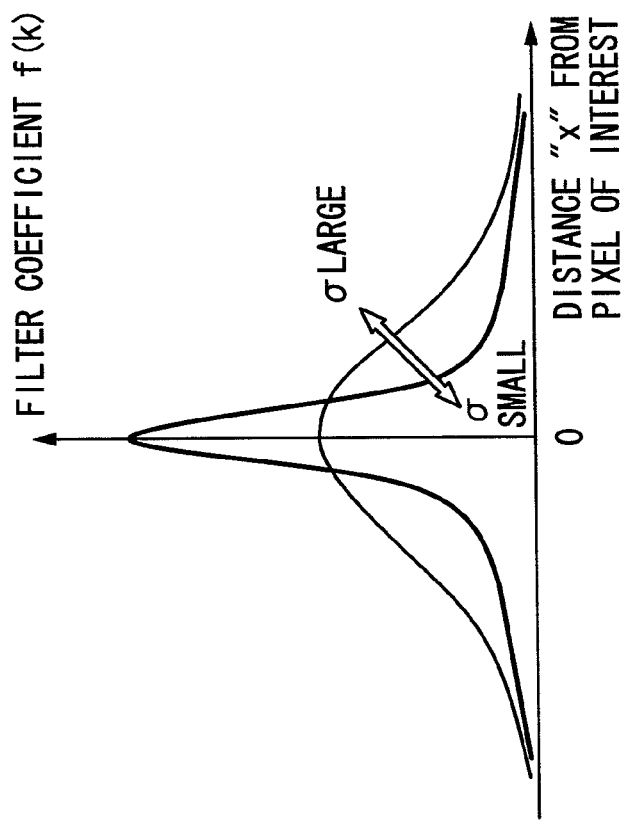
FIGS. 18A and 18B are a graph for showing the relationship between an absolute value |k| of a gradation amount and the parameter σ of a Gaussian filer, and a graph for showing the relationship between a distance "x" from a pixel of interest and a filter coefficient f(x) of a Gaussian filter, respectively.
Figure 18A:
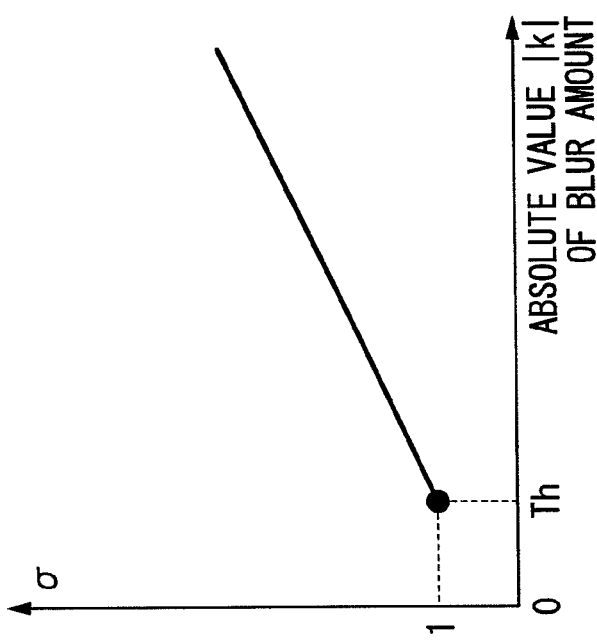

As described above, in the present embodiment, a Gaussian filter is used for this filter processing. FIGS. 18A and 18B are graphs for showing the relationship between the absolute value |k| of a blur amount and the parameter σ of a Gaussian filer. As shown in FIGS. 18A and 18B, if the absolute value |k| of a blur amount is larger than the threshold "Th", the parameter σ of the Gaussian filter in proportional relation to the absolute value |k| of a blur amount is calculated and a Gaussian filter coefficient f(x) appropriate for this parameter σ is determined. The CPU 24 determines the parameter σ on the basis of this relationship stored in the RAM area of the main memory 28.

FIG. 18B is a graph for showing the relationship between a distance "x" from a pixel of interest and the filter coefficient f(x) of a Gaussian filter. As shown in FIG. 18B, the Gaussian filter takes a weighted average by making the weights of peripheral pixels greater with the increase of the parameter δ. Accordingly, it is possible to make the degree of smoothing higher as the absolute value |k| of a blur amount becomes larger by increasing the parameter σ according to the magnitude of the absolute value |k| of a blur amount.

In order to calculate the filter coefficient f(x) from the parameter σ thus evaluated, a calculation is made using [Formula 2] and the calculated filter coefficients are normalized so that the total sum thereof equals 1.

$$f(x) = \frac{1}{\sigma\sqrt{2\pi}}\exp\left(-\frac{x^2}{2\sigma^2}\right) \quad \text{[Formula 2]}$$

In the case of a digital filter, f(x) is determined for each of discrete positions centered around the pixel of interest. For example, in the case of a five-tap filter, f(x)={0.1, 0.2, 0.4, 0.2, 0.1}, for example, holds true. Note that in general, the filter coefficient is normalized so that the total sum of respective coefficients equals 1.0, in order to prevent a change in the brightness of images. Although Formula 2 is represented using a one-dimensional filter coefficient, it is possible to perform two-dimensional filter processing by applying this filter sequentially both in a horizontal direction and in a vertical direction.

As described above, filter processing appropriate for the blur amount is performed on the selected pixel to calculate an output pixel value (step S145). This processing is performed on all pixels. Upon determination that the processing has been completed for all pixels (step S66), blurring process terminates. By performing filter processing in this way on the reference image photographed at the in-focus position B of the main subject, it is possible to achieve even more natural blur emphasis.

Note that the filter used for this filter processing is not limited to a Gaussian filter, but may be another filter as long as the filter is a lowpass filter. For example, there may be used a filter having a blur form appropriate for an aperture or lens characteristics.

Upon completion of blurring process, the CPU 24 records an output image provided by the filter processing unit 40 on the recording medium 33 through the memory control unit 32. Thus, the all-in-focus image photographing mode terminates (step S27).

As described above, it is possible to obtain a blur-emphasized image.

Note that the blurring process shown in FIGS. 16 and 17 in the present embodiment may be performed on images not subjected to the corresponding point detection and the image deformation. That is, this image synthesis process may be directly performed on a plurality of images obtained by focus bracket photography.

Furthermore, it should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image pickup apparatus comprising:
an automatic in-focus position determination device which determines an in-focus position of a main subject on the basis of image data;
a focus bracket photography device which obtains a plurality of images by successively photographing images while discretely moving a focal position by a predetermined moving amount;
a focal position control device which controls the focal position, so as to include the in-focus position of the main subject determined by the automatic in-focus position determination device and focal positions forward and backward from the in-focus position;
a corresponding point detection device configured to detect a corresponding point in the plurality of images obtained by the focus bracket photography device;
an image deformation device configured to perform image deformation on each of the plurality of images other than a reference image selected from the plurality of images according to a predetermined criteria, so that positions of the corresponding points in each of the plurality of images other than the reference image are in agreement with the positions of corresponding points in the reference image;
an image synthesis device which synthesizes the plurality of images which are deformed by the image deformation device and the reference image; and
a recording device which records an image obtained by the image synthesis device on a recording medium,
wherein the image synthesis device selects a pixel photographed at the in-focus position of the main subject, among pixels at corresponding coordinates among the plurality of images which are deformed by the image deformation device and the reference image, if sharpness of the pixel is maximum, selects a pixel photographed at a focal position which is opposite to a focal position having the maximum value of sharpness across the in-focus position of the main subject, if the sharpness of the pixel photographed at the focal position other than the in-focus position of the main subject is maximum, and performs image synthesis.

2. The image pickup apparatus according to claim 1, wherein
the focal position control device varies the focal position at focal positions forward and backward of from the in-focus position according to a depth of field.

3. The image pickup apparatus according to claim 2, wherein
the focal position control device controls the focal position on the basis of at least one of an aperture at the time of photographing and a focal distance at the time of photographing.

4. The image pickup apparatus according to claim 1, further comprising
a blur emphasis degree setting device configured to set a blur emphasis degree,
wherein the image synthesis device selects a pixel depending on the set blur-emphasis degree, if the sharpness of the pixel photographed at the focal position other than the in-focus position of the main subject is maximum, and there is a plurality of images at focal positions which are opposite to a focal position having the maximum value of sharpness across the in-focus position of the main subject.

5. An image processing apparatus comprising:
an input device which inputs a plurality of images of an identical scene respectively photographed at different focal positions, including an image photographed at an in-focus position of a main subject and images photographed at focal positions forward and backward from the in-focus position of the main subject;
a corresponding point detection device configured to detect a corresponding point in the plurality of images obtained by photographing the identical scene at different focal positions;
an image deformation device configured to perform image deformation on each of the plurality of images other than a reference image selected from the plurality of images according to a predetermined criteria, so that positions of the corresponding points in each of the plurality of images other than the reference image agree with the positions of corresponding points in the reference image;
an image synthesis device which synthesizes the plurality of images which are deformed by the image deformation device and the reference image; and
an output device which outputs an image obtained by the image synthesis device,
wherein the image synthesis device selects a pixel photographed at the in-focus position of the main subject, among pixels at corresponding coordinates among the plurality of images which are deformed by the image deformation device and the reference image, if sharpness of the pixel is maximum, selects a pixel photographed at a focal position which is opposite to a focal position having the maximum value of sharpness across the in-focus position of the main subject, if the sharpness of the pixel photographed at the focal position other than the in-focus position of the main subject is maximum, and performs image synthesis.

6. An image pickup method comprising:
an automatic in-focus position determination step of determining an in-focus position of a main subject on the basis of image data;
a focus bracket photography step of obtaining a plurality of images by successively photographing images while discretely moving a focal position by a predetermined moving amount;
a focal position control step of controlling the focal position, so as to include the in-focus position of the main subject determined by the automatic in-focus position determination step and focal positions forward and backward from the in-focus position of the main subject;
a corresponding point detection step of detecting a corresponding point in the plurality of images obtained by the focus bracket photography step;
an image deformation step of performing image deformation on each of the plurality of images other than a reference image selected from the plurality of images according to a predetermined criteria, so that positions of the corresponding points in each of the plurality of images other than the reference image agree with the positions of corresponding points in the reference image;
an image synthesis step of synthesizing the plurality of images which are deformed by the image deformation step and the reference image; and
a recording step of recording an image obtained by the image synthesis step on a recording medium,
wherein the image synthesis device selects a pixel photographed at the in-focus position of the main subject, among pixels at corresponding coordinates among the plurality of images which are deformed by the image deformation step and the reference image, if sharpness of the pixel is maximum, selects a pixel photographed at a focal position which is opposite to a focal position having the maximum value of sharpness across the in-focus position of the main subject, if the sharpness of the pixel photographed at the focal position other than the in-focus position of the main subject is maximum, and performs image synthesis.

7. An image processing method comprising:
using one or more processors to carry out:
an input step of inputting a plurality of images of an identical scene respectively photographed at different focal positions, including an image photographed at an in-focus position of a main subject and images photographed at focal positions forward and backward from the in-focus position of the main subject;
a corresponding point detection step of detecting a corresponding point in the plurality of images obtained by the photographed plurality of images of the identical scene at different focal positions;
an image deformation step of performing image deformation on each of the plurality of images other than a reference image selected from the plurality of images according to a predetermined criteria, so that positions of the corresponding points in each of the plurality of images other than the reference image agree with the positions of corresponding points in the reference image;
an image synthesis step of synthesizing the plurality of images which are deformed by the image deformation device and the reference image; and
an output step of outputting an image obtained by the image synthesis step, wherein the image synthesis device selects a pixel photographed at the in-focus position of the main subject, among pixels at corresponding coordinates among the plurality of images which are deformed by the image deformation step and the reference image, if sharpness of the pixel is maximum, selects a pixel photographed at a focal position which is opposite to a focal position having the maximum value of sharpness across the in-focus position of the main subject, if the sharpness of the pixel photographed at the focal position other than the in-focus position of the main subject is maximum, and performs image synthesis.

\* \* \* \* \*